A. O. ABBOTT, Jr.
MOLD OPENING DEVICE.
APPLICATION FILED MAY 25, 1921.

1,424,791.

Patented Aug. 8, 1922.
2 SHEETS—SHEET 1.

INVENTOR
Adrian O. Abbott, Jr.
BY Ernest Hopkinson
HIS ATTORNEY

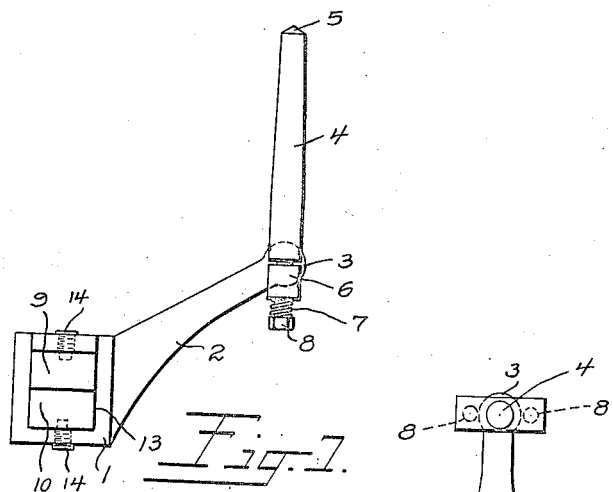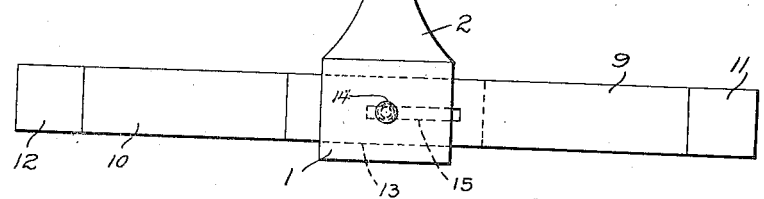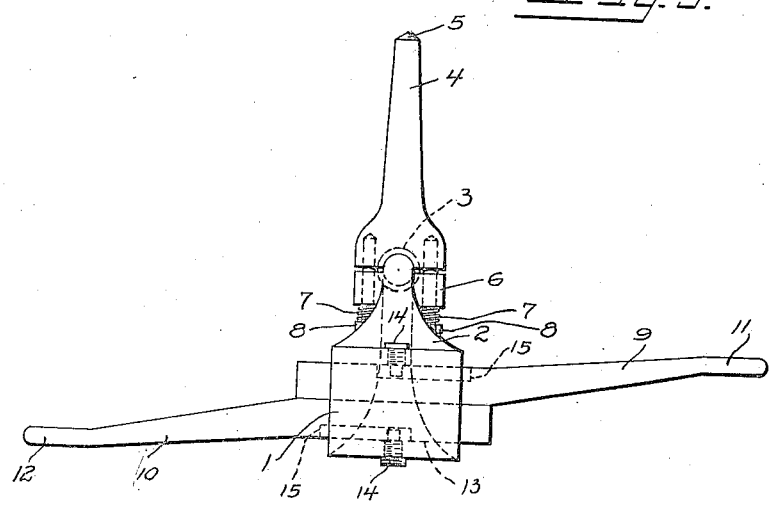

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

MOLD-OPENING DEVICE.

1,424,791. Specification of Letters Patent. Patented Aug. 8, 1922.

Application filed May 25, 1921. Serial No. 472,498.

*To all whom it may concern:*

Be it known that I, ADRIAN O. ABBOTT, Jr., a citizen of the United States, and a resident of Detroit, county of Wayne, and State of Michigan, have invented a certain new and useful Mold-Opening Device, of which the following is a full, clear, and exact description.

This invention relates to apparatus for manufacturing tires, and more particularly to a device for separating the mold sections from the tires after they have been cured.

After the tires have been cured on a carrier (of the core type or of the sealing ring type), difficulty is encountered in removing them from the curing molds which give their exterior the exact size and shape desired. The design or non-skid structure of the tread, renders it necessary to exert considerable force in separating the mold shells. Heretofore this separation has been accomplished with a wedge that has been turned or twisted.

The present invention aims to obviate the arduous manual method of opening the molds by providing a ram-operable device for simultaneously separating both sections of a mold from the carrier, and thereby, from the tire which is mounted upon the carrier.

Briefly, the invention consists of a pair of flat-ended bars secured in a holder that has a lateral offset arm which is articulated to a strut adapted when the arm is raised to cant the flat-ended bars on edge and thereby pry both mold sections from the tire walls.

The invention in a preferred form is illustrated in the accompanying drawings, in which:

Figs. 1 and 2 are elevations, partly in section, of the device in operative relation with a press type of heater showing the mold sections before and after elevation of the arm.

Figs. 3 and 4 are views corresponding to Figs. 1 and 2 respectively, but taken at about 90° thereto.

Fig. 5 is a plan view of the device itself; and

Figs. 6 and 7 are front and end elevations respectively of the same.

Figure 1:
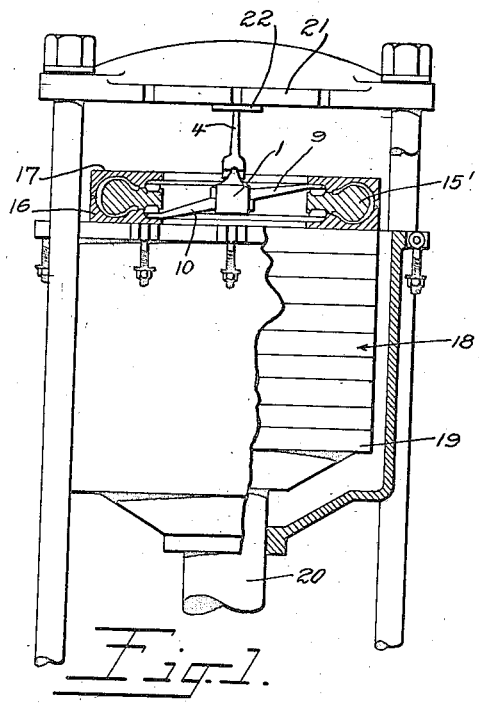

Referring to Figs. 5 to 7 for the present, the device consists of a holder 1 having an offset cooperating arm 2 which terminates in a ball 3. A strut 4, having a more or less conical end 5 is articulated to the ball end 3 by the split and socketed cap indicated at 6, the latter being preferably yieldably closed upon the ball 3 by springs 7, interposed between the cap 6 and the heads of bolts 8, which are threaded therethrough and into the strut 4.

The holder 1 may be shaped in any suitable manner to slidably receive prying bars 9 and 10 of the slightly bent form shown best in Fig. 6, these bars terminating in reduced flattened ends 11 and 12 respectively. The holder 1 has a rectangular opening 13 in its body and guide studs 14, which latter are adapted to enter slots 15 formed in each of the bars 9 and 10, the last named construction permitting ready shift of the bars 9 and 10 in opposite directions and endwise for introduction between mold sections of any size and a tire carrier 15' of the core type illustrated, or of the sealing ring type.

Figure 2:
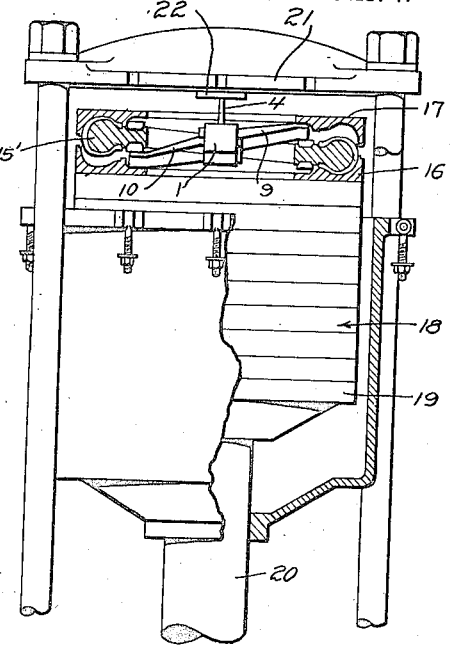
Figure 3:
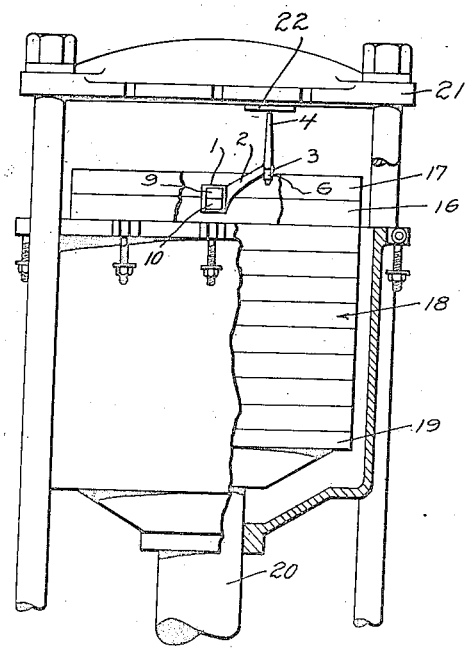
Figure 4:
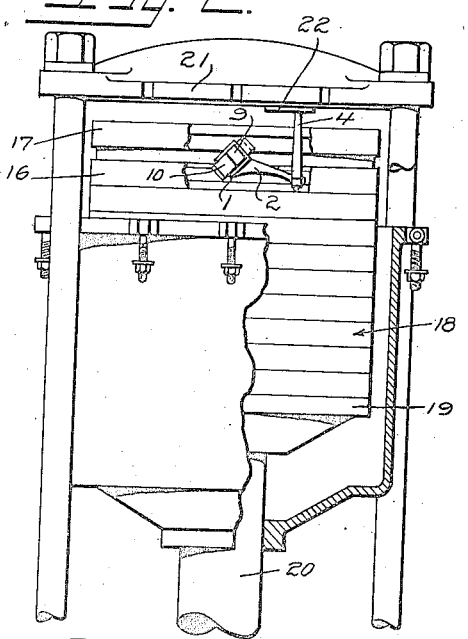

In operation the arms 9 and 10 are retracted and then inserted between the carrier 15', and the respective sections 16 and 17, as illustrated in Fig. 1. Thus positioned in the uppermost mold of a batch indicated at 18 resting on the platen 19, upward movement of the ram 20 will carry the end of the strut 4 into engagement with the dome or cover 21 of the press and cause the respective mold sections to be separated from the tire on the carrier in the manner shown in Fig. 2. If desired, but not necessarily, the cover 21 may be provided with an indented wear plate indicated at 22.

The device is extremely simple in construction and reliable and durable in service. The force necessary to elevate the molds so as to remove them from the press is thus advantageously utilized to open them without manual expenditure of energy. After the uppermost mold has been "broken", i. e., has its sections separated from the tire, the device of the present invention can be removed and again positioned for operation on the next mold in the stack, the previously opened mold having been removed.

It will be obvious that many changes may be made in the construction as above disclosed without departing from the principles of the invention, and reference should therefore be made to the annexed claims, which set forth its scope.

Having thus described my invention, what I claim and desire to protect by Letters Patent is:

1. The combination with a sectional mold and an internal carrier and with a press type of vulcanizer having a movable ram and relatively stationary cover, of a device for separating both of the mold sections from a tire on the carrier by upward movement of the ram on which the mold rests.

2. A device for separating sectional molds from an inclosed tire mounted on a carrier comprising relatively flat-ended members insertable between the carrier sections, and means articulated to said members for canting them edgewise when a mold is moved axially.

3. A device for separating sections of a mold from a tire mounted on a carrier comprising a holder, prying bars mounted in and extending oppositely from said holder, and means operatively secured to the holder for turning the prying bars on edge upon axial movement of the mold.

4. A device for separating sections of a mold from a tire mounted on a carrier comprising a holder, prying bars shiftable endwise only in said holder, and means operatively secured to the holder for turning the prying bars on edge upon axial movement of the mold.

5. A device for separating sections of a mold from a tire mounted on a carrier comprising a holder having an offset arm fixed thereto, an operating strut articulated to said arm, and prying bars secured in said holder extending oppositely therefrom and having flat ends adapted to be introduced between the respective mold sections and the carrier for simultaneously freeing both sides of a cured tire.

Signed at Detroit, in the county of Wayne, and State of Michigan, this 17th day of May, 1921.

ADRIAN O. ABBOTT, Jr.